United States Patent

Kawaguchi et al.

[11] Patent Number: 5,173,829
[45] Date of Patent: Dec. 22, 1992

[54] PROJECTION ON RETAINING ELEMENT OF TAPE CASSETTE

[75] Inventors: Takahisa Kawaguchi; Haruomi Enomoto; Tatehiko Ikeda, all of Ichikai, Japan

[73] Assignee: KAO Corporation, Tokyo, Japan

[21] Appl. No.: 631,362

[22] Filed: Dec. 20, 1990

[30] Foreign Application Priority Data

Dec. 27, 1989 [JP] Japan .................. 1-150592[U]

[51] Int. Cl.$^5$ ............................................. G11B 23/02
[52] U.S. Cl. ..................................... 360/132; 242/199
[58] Field of Search ......................... 360/132; 242/199

[56] References Cited

U.S. PATENT DOCUMENTS 4,926,279  5/1990  Kurashina ..................... 360/132

Primary Examiner—A. J. Heinz
Attorney, Agent, or Firm—Birch, Stewart, Kolasch and Birch

[57] ABSTRACT

A tape cassette of the present invention comprises an upper half and a lower half constituting a cassette body which rotatably contains a hub with a tape wound thereon, a slider disposed in such a manner as to cover the lower half for movement forward and backward, and a spring disposed to a front end portion of the lower half in order to urge the slider forward, a pair of retaining elements each having a projection formed on an outer side thereof being integrally connected to the lower half, the projections being engaged in a pair of first holes or a pair of second holes formed in front and rear portions of the slider to retain the slider urged by the spring, so that a pair of opening portions formed in the lower half can be opened and closed by a pair of opening portions formed in the slider, the height $l_1$ of a perpendicular surface of each of the projections on the connecting side of the retaining elements being higher than the height $l_2$ of a perpendicular surface of each of the projections on the tip side of the retaining elements.

6 Claims, 3 Drawing Sheets

PROJECTION ON RETAINING ELEMENT OF TAPE CASSETTE

BACKGROUND OF THE INVENTION

1. Field of the Invention

This invention relates to a tape cassette and more particularly to a tape cassette which is not dislocated nor slipped out of the cassette body even when impact is applied to a slider mounted on a cassette body for forward and backward movement.

2. Description of the Prior Art

A conventional tape cassette will be described with reference to FIGS. 3 through 7. This conventional tape cassette, as shown in FIG. 3, comprises an upper half 1 and a lower half 2 constituting a cassette body which rotatably contains a hub (not shown) with a tape wound thereon, a slider 3 disposed in such a manner as to cover the lower half 2 for movement forward and backward, and a spring (not shown) disposed to a front end of the lower half 2 in order to normally urge the slider 3 forward, a front cover 4 being disposed to front edges of the upper and lower halves 1 and 2 in such a manner as to be able to open and close, so that the front edges are opened or closed depending on whether the cassette tape is being used or not.

The lower half 2, as shown in FIGS. 4 through 6, are integrally provided with a pair of retaining elements 22 each having a projection 22A at a free end thereof, the projection 22A being able to engage in a first or second hole 32, 33, the first hole 32 being formed in a front part of the slider 3 and the second hole 33 being formed in a rear part thereof. In accordance with the reciprocal movement of the slider 3, the projections 22A of the retaining elements 22 are moved upward and downward relative to a surface of the lower half 2 and engaged in the first or second hole 32 or 33 so that the retaining elements 22 are retained in positions for opening and closing a pair of opening portions 21, 21 formed in the lower half 2 through a pair of opening portions 31, 31 formed in the slider 3.

Each of the retaining elements 22, as shown in FIG. 4, is formed into an elongated rectangular form extending in the forward and backward direction from its one end (or one side) integrally connected to the lower half 2, and a gap 23 is formed between the remaining three sides of the retaining element 22 and the lower half 2.

In the conventional tape cassette, the projection 22A of each of the retaining element 22 integrally connected to the lower half 2 is symmetrically formed when viewed in cross section in the longitudinal direction of the retaining element 22 as shown in FIGS. 6 and 7. That is, the height $l_1$ of a perpendicular surface 221A of the projection 22A on the connecting side of retaining element 22 and the height $l_2$ of a perpendicular surface 222A of the projection 22A on the tip side (or free end) side of the retaining element 22 are formed into the same dimension $l_1 = l_2$), so that the perpendicular surface 221A normally receives a biasing force P owing to the spring through the first hole 32 of the slider 3 or the second hole 33 thereof. If the height of the projection 22A is represented by $l_3$, it is usually such that $l_3/l_1 = 1.2 \sim 1.7$.

Furthermore, both the perpendicular surfaces 221A and 222A have guide surfaces 223A and 224A inclined inwardly and upwardly respectively so that the retaining elements 22 are guided inwardly through these guide surfaces 223A and 224A when the slider 3 is reciprocally moved.

When the conventional tape cassette is loaded in a recording/reproducing apparatus at the time the tape cassette is used, the front cover 4 of the tape cassette is opened and the slider 3 is moved backward against the biasing force P of the spring. As a result, the opening portions 31, 31 of the slider 3 are overlapped with the opening portions 21, 21 of the lower half 2. As a result, a driving portion of the recording/reproducing apparatus is brought into engagement with the hub so that the hub will be ready to rotate. At that time, the retaining element 22 of the lower half 2 is engaged in the first hole 32 of the slider 3 by its projection 22A to retain the slider 3 in order to maintain the first hole 32 in its open state as shown in FIG. 6.

On the other hand, when recording to or reproducing from the tape is over and the tape cassette is removed from the recording/reproducing apparatus, the retaining element 22 of the lower half 2 is pivoted about the connecting portion when the slider 3 is moved forward by the biasing force P of the spring. As a result, the projection 22A is disengaged from the first hole 32 of the slider 3 and pushed into the lower half 2 to climb over a plane between the first hole 32 and the second hole 33 into the second hole 33, and the opening portion 31 of the slider 3 slider from the opening portion 21 of the lower half 2. Since the opening portion 31 and the opening portion 21 no longer overlaps, the opening portion 21 of the lower half 2 is closed.

However, since the upper and lower halves 1 and 2, the slider 3, etc. of the tape cassette are formed, in general, by injection molding from synthetic resin, they are easily deformed under a high atmospheric temperature. Also, since the retaining element 22 receives the biasing force P of the spring by the perpendicular surface 221A of the projection 22A on the connecting side of the retaining element 22 through the slider 3, the retaining element 22 has a tendency to bend inwardly owing to the moment of rotation of the biasing force P. Moreover, in the conventional tape cassette, when the projection 22A is bent, even by a small amount, by the moment of rotation received by the retaining element 22 from the slider 3, the engaging state between the projection 22A and the first hole 32 or second hole 33 of the slider 3 becomes insufficient. When impact is applied to the tape cassette in the foregoing state, the retaining function of the retaining element 22 is canceled, and there is a danger that the slider 3 will move forward excessively, owing to the biasing force P of the spring and will be slipped out of the lower half 2.

On the other hand, there remains the problem that, since the heights $l_1$, $l_2$ of both the perpendicular surfaces 221A, 222A of the projection 22A are set such that the slider 2 is retained in its opened or closed position and the projection 22A is disengaged from the hole 32 or 33 at the moment the slider is reciprocally moved, the heights are naturally limited.

SUMMARY OF THE INVENTION

One object of the present invention is to provide a tape cassette, in which a slider is not slipped out of the lower half when impact is applied to the tape cassette, because projections of retaining elements formed on the lower half are firmly engaged in first or second holes of the slider.

The inventors of the present invention have found out that the above object can be achieved by providing retaining elements, each having a projection of a predetermined configuration, on the lower half of a tape cassette.

The present invention has been accomplished based on the above finding. According to the present invention, there is provided a tape cassette comprising an upper half and a lower half constituting a cassette body which rotatably contains a hub with a tape wound thereon, a slider disposed in such a manner as to cover the lower half for movement forward and backward, and a spring disposed to a front end portion of the lower half in order to urge the slider forward, a pair of retaining elements each having a projection formed on an outer side thereof being integrally connected to the lower half, the projections being engaged in a pair of first holes or a pair of second holes formed in front and rear portions of the slider to retain the slider urged by the spring, so that a pair of opening portions formed in the lower half can be opened and closed by a pair of opening portions formed in the slider, the height of a perpendicular surface of each of the projections on the connecting side of the retaining elements being higher than the height of a perpendicular surface of each of the projections on the tip side of the retaining elements.

According to a tape cassette of the present invention, the slider can be retained by surely retaining the slider urged by the spring by the perpendicular surfaces of the projections formed on the connecting side of the retaining elements formed on the lower half. That is, according to the tape cassette of the present invention, even when impact is applied to the tape cassette, there is no danger that the slider will slip out of the lower half because the retaining elements formed on the lower half are firmly engaged in the first or second holes of the slider through projections of the retaining elements.

BRIEF DESCRIPTION OF THE DRAWINGS

FIG. 1(a) is a plan view showing one state of a lower half and a slider used in the tape cassette, in which the lower half and the slider are taken out in their integrated state, and FIG. 1(b) is a sectional view taken on line I—I of FIG. 1(a), FIG. 1(c) is a longitudinal sectional view showing an important portion of a retaining element of the lower half shown in FIG. 1(a);

DETAILED DESCRIPTION OF THE INVENTION

Figure 1A:
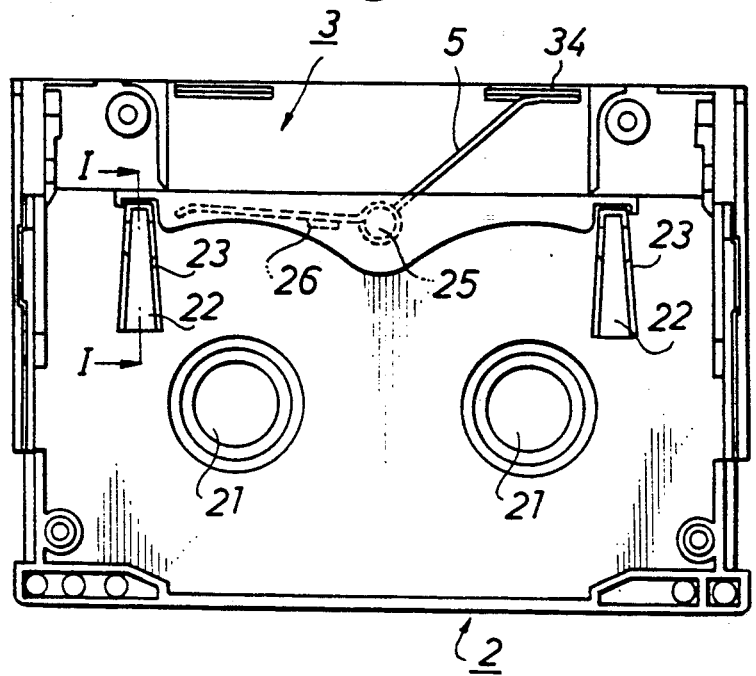
FIGS. 1(a), 1(b) and 1(c) are plan views showing one embodiment of a tape cassette of the present invention respectively.

The feature of the present invention will be described with reference to the embodiment shown in FIGS. 1(a) through 1(c) and FIG. 2, in which either identical or similar parts of the prior art will be denoted by identical reference numerals.

Figure 3:
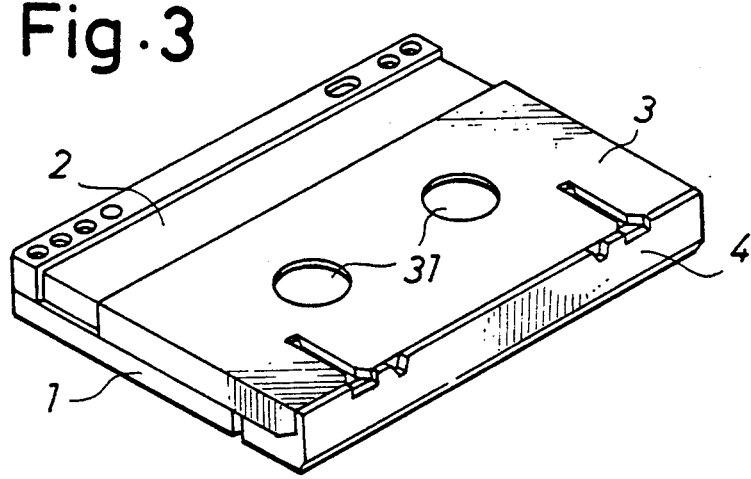
FIG. 3 is a perspective view showing the conventional tape cassette.
Figure 4:
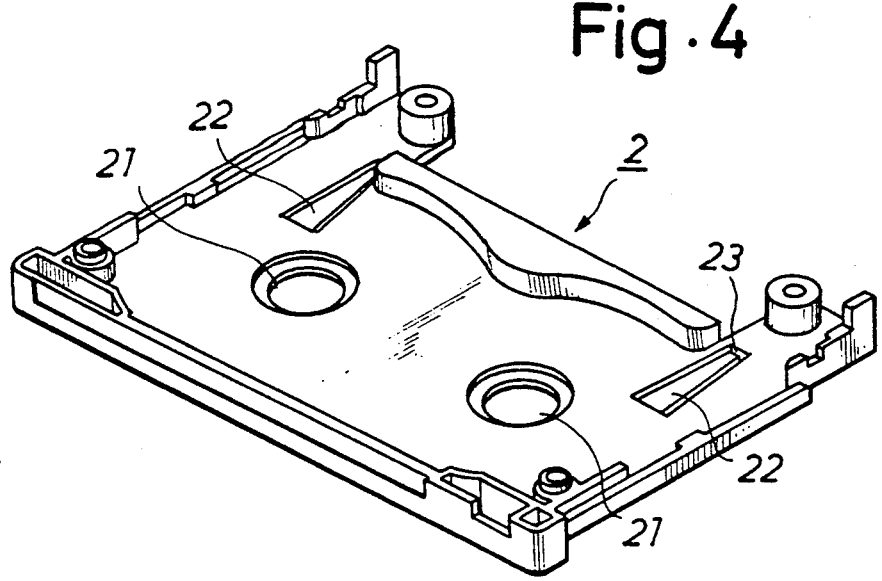
FIG. 4 is a perspective view showing the interior of the lower half which is already taken out from the state of FIG. 3.
Figure 5:
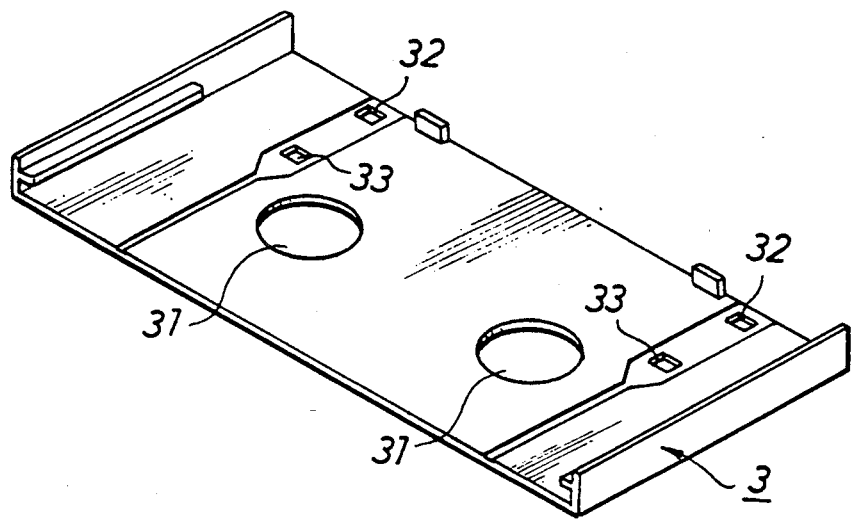
FIG. 5 is a perspective view showing the interior of the slider which is already taken out from the state of FIG. 3.
Figure 6:
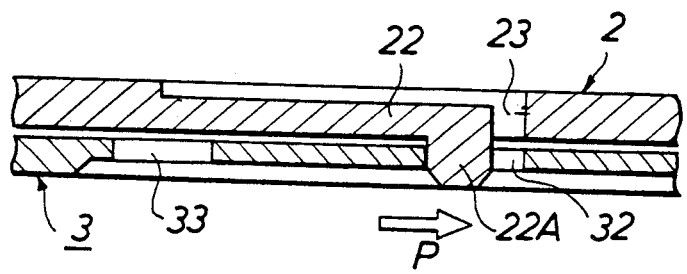
FIG. 6 is a sectional view of an important portion showing the relation between the lower half of FIG. 4 and a slider of FIG. 5.

A tape cassette of this embodiment, as shown in FIG. 3, includes an upper half 1 and a lower half 2 constituting a cassette body, a front cover 4 disposed to a front edge of the upper and lower halves 1 and 2, and a slider 3 disposed in such a manner as to cover the lower half 2 for movement forward and backward. In this respect, this embodiment is constructed in the same way as the prior art.

Also, the lower half 2, as shown in FIG. 1(a), is provided with a pair of opening portions 21, 21 with which a hub (not shown) with a tape wound thereon faces. A pair of retaining elements 22, 22 are integrally formed on the lower half 2 at front parts of both sides of the opening portions 21, 21 in order to retain the slider 3 in the predetermined position. A space 23 is formed between the remaining three sides (three sides excluding the connecting end or side) of each of the retaining elements 22, 22 and the lower half 2.

In FIG. 1(a), the numeral 25 denotes a mounting portion for mounting a spring 5 thereon, and the numerals 26, 34 denote retaining portions for retaining both ends of the spring 5.

Figure 1B:
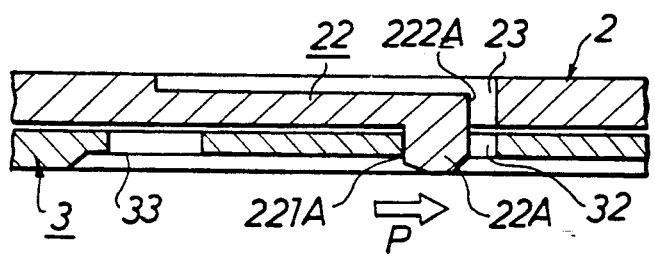
Figure 1C:
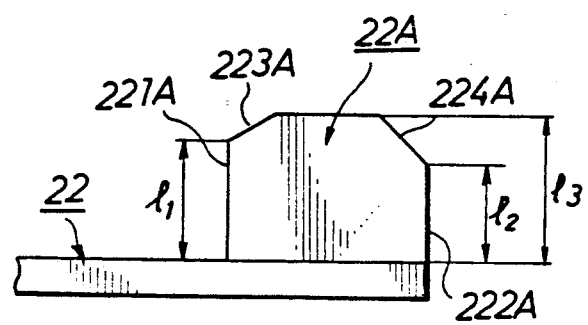
Figure 2:
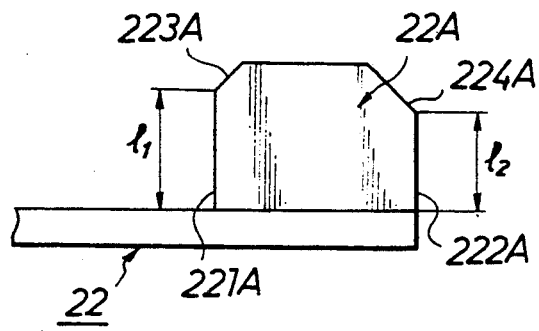
FIG. 2 is a view, corresponding to FIG. 1(c), showing another embodiment of the tape cassette of the present invention.

A projection 22A of each of the retaining elements 22 is designed such that the height $l_1$ of a perpendicular surface 221A on the connecting side of the retaining element 22, i.e., the surface 221A receiving a biasing force P of the spring 5, is higher than the height $l_2$ of a perpendicular surface 222A on a tip side of the retaining element 22 as shown in FIGS. 1(b) and 1(c). In other words, the angle of inclination (angle of inclination with reference to the surface of the lower half 2) of a guide surface 223A inclining toward the connecting side of the retaining element of the projection 22A of this embodiment is the same in the starting point of inclination to the prior art, but it is more gentle than the angle of inclination of the guide surface 223A of the prior art. In this way, by arranging the height $l_1$ of the perpendicular surface 221A on the connecting side of the retaining element 22 of the projection 22A higher than the height $l_2$ of the perpendicular surface 222A on the tip side of the retaining element 22, an engaging surface thereof relative to the respective holes 32, 33 of the slider 3 can be taken larger in the height direction compared with the prior art as shown in FIG. 1(b), so that the projection 22A can be surely engaged in the respective holes 32, 33. Accordingly, even if the retaining element 22 is slightly bent inwardly of the cassette body as a result of resilient contact of the slider 3 with the perpendicular surface 221A owing to the biasing force P of the spring 5, the projection 22A is fully engaged with the slider 3 at the perpendicular surface 221A to surely retain the slider 3 so that the slider 3 will not be slipped out. $l_1/l_2$ is preferably 1.1~1.8 and particularly preferably 1.1~1.3. Similarly, $l_3/l_1$ is preferably 1.2~1.7 and particularly preferably 1.5~1.7. As shown in FIG. 1(c), the height $l_3$ shows the height of the projection 22A, and the height $l_2$ shows the height of the perpendicular surface 222A of the projection 22A.

Figure 7:
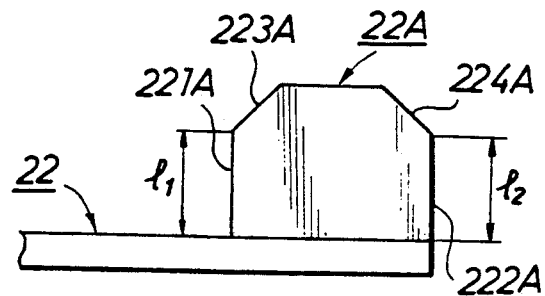
FIG. 7 is a forward and backward sectional view showing the projection of the retaining element formed on the lower half of FIG. 6 in its enlarged scale.

Also, even if the starting point of inclination of the guide surface 223A of the projection A is displaced toward the connecting side of the retaining element 22 compared with that of the prior art shown in FIG. 7 and the angle of inclination thereof is made steep, there can be obtained the same height to that of the perpendicular surface 221A of the projection 22A shown in FIG. 1(c).

Since it is unnecessary to take into consideration the biasing force P owing to the spring 5, the perpendicular surface 222A of the projection 22A is formed into the same height as that of the prior art. In the projection of the tape cassette of the present invention, it is good enough if the perpendicular surface on the connecting side of the retaining element is formed higher than the perpendicular surface on the tip side of the retaining element, and the perpendicular surface can be formed in various configurations such as plane, arcuate or the like.

What is claimed is:

1. A tape cassette comprising:
   (a) a cassette body comprising an upper half, and a lower half having a pair of opening portions and a pair of retaining elements, wherein said retaining elements each have a connecting side integrally connected to said lower half and a tip side unconnected to said lower half, wherein said retaining elements each have an inner surface, and an outer surface having a projection formed thereon on said tip side, wherein said projections each have two surfaces perpendicular to said outer surface of said retaining element, wherein one of said perpendicular surfaces faces said connecting side of said retaining element and has a height $l_1$, and the other of said perpendicular surfaces faces said tip side of said retaining element and has a height $l_2$, wherein said height $l_1$ is greater than said height $l_2$, and wherein the ratio of $l_1/l_2$ is from 1.1 to 1.8;
   (b) a hub with a tape wound thereon, rotatably contained within said cassette body;
   (c) a slider movably covering said lower half, having a pair of opening portions, and having a front and rear portion, said front and rear portion each having a pair of holes;
   (d) a spring, disposed on said front portion of said lower half and applying a biasing force to said slider urging said slider forward; wherein said projections on said retaining elements of said lower half each engage one of said pairs of holes in said slider, such that said opening portions of said lower half are opened by superimposing said opening portions of said slider on said opening portions of said lower half, and wherein said projections on said retaining elements engage the other of said pairs of holes in said slider, such that said opening portions of said slider are not superimposed on said opening portions of said lower half.

2. The tape cassette according to claim 1, wherein said ratio of $l_1/l_2$ is from 1.1 to 1.3.

3. The tape cassette according to claim 2, wherein said projections on said retaining elements each have a height $l_3$, and wherein the ratio of $l_3/l_1$ is from 1.2 to 1.7.

4. The tape cassette according to claim 3, wherein said ratio of $l_3/l_1$ is from 1.5 to 1.7.

5. The tape cassette according to claim 1, wherein said projections on said retaining elements each have a height $l_3$, and wherein the ratio of $l_3/l_1$ is from 1.2 to 1.7.

6. The tape cassette according to claim 5, wherein said ratio of $l_3/l_1$ is from 1.5 to 1.7.

* * * * *